United States Patent [19]

Ibar

[11] Patent Number: 5,306,129
[45] Date of Patent: Apr. 26, 1994

[54] MOLDING DEFORMABLE MATERIALS WITH USE OF VIBRATING WALL SURFACES

[75] Inventor: Jean-Pierre Ibar, New Canaan, Conn.

[73] Assignee: Solomat Partners, L.P., Stamford, Conn.

[21] Appl. No.: 880,926

[22] Filed: May 11, 1992

[51] Int. Cl.⁵ .............................................. B28B 21/00
[52] U.S. Cl. ........................................ 425/3; 264/70; 425/328; 425/368; 425/382.3; 425/393; 425/456
[58] Field of Search .................. 264/69, 70, 71; 425/174, 328, 363, 368, 377, 381, 382.3, 392, 393, 456, 3

[56] References Cited

U.S. PATENT DOCUMENTS

| | | |
|---|---|---|
| 2,408,627 | 10/1946 | Green . |
| 3,205,289 | 9/1965 | Carpenter ............................ 264/280 |
| 3,275,730 | 9/1966 | Feild ........................................ 264/174 |
| 3,474,652 | 10/1969 | Marcovitch ............................. 72/190 |
| 3,643,485 | 2/1972 | Marcovitch ............................... 72/96 |
| 4,141,953 | 2/1979 | Kepes et al. .......................... 264/340 |
| 4,198,461 | 4/1980 | Keller et al. .......................... 428/288 |
| 4,288,398 | 9/1981 | Lemelson ............................... 264/23 |
| 4,403,069 | 9/1983 | Keller et al. .......................... 525/197 |
| 4,469,649 | 9/1984 | Ibar ........................................ 264/23 |
| 4,755,338 | 7/1988 | Harala ................................... 425/456 |
| 4,919,870 | 4/1990 | Ibar ........................................ 264/70 |
| 4,957,424 | 9/1990 | Mitchell et al. ...................... 425/456 |
| 5,147,196 | 9/1992 | Adly ...................................... 425/456 |

FOREIGN PATENT DOCUMENTS

| | | |
|---|---|---|
| 2414819 | 10/1979 | Fed. Rep. of Germany . |
| 2017980 | 5/1970 | France . |
| 876428 | 11/1981 | U.S.S.R. ............................... 425/456 |
| 885034 | 12/1981 | U.S.S.R. ............................... 425/456 |
| 1121369 | 10/1984 | U.S.S.R. ............................... 425/456 |
| 2170142 | 7/1986 | United Kingdom . |

*Primary Examiner*—Charles S. Bushey
*Attorney, Agent, or Firm*—Seidel, Gonda, Lavorgna & Monaco

[57] ABSTRACT

An apparatus for shaping, and/or directing the flow of deformable materials, wherein the apparatus includes a novel vibrating wall assembly having at least one surface which defines a specific geometric shape over which the deformable material will pass. The novel vibrating wall assembly of this present invention includes the following components: (a) a plurality of pulsating, polygonally-shaped surface elements which are movable between a resting position and an energized position; (b) an energizing device for moving at least one of the plurality of pulsating surface elements from its resting position to its energized position, to form an energized surface element; (c) a biasing device for moving the energized surface element from its energized position back to its resting position; and (d) a linking device for interconnecting the plurality of pulsating surface elements, wherein the linking device allows for the limited pulsating movement of the plurality of pulsating surface elements.

14 Claims, 9 Drawing Sheets

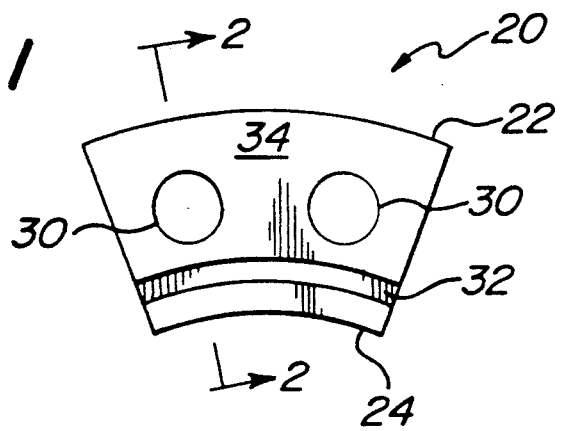
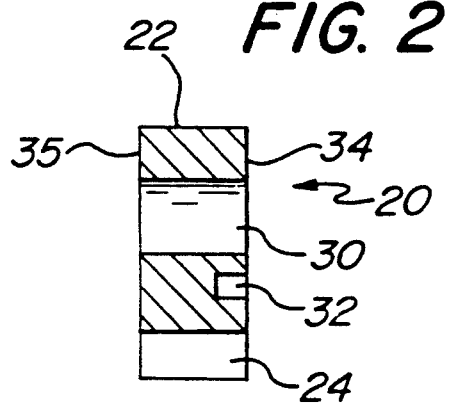
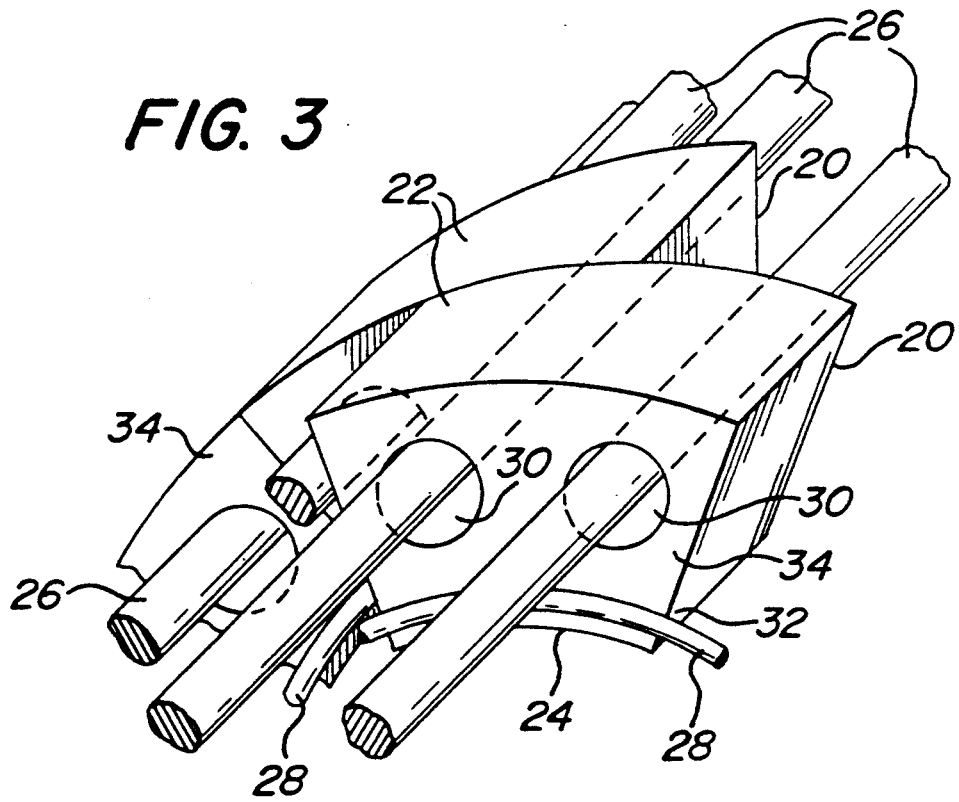

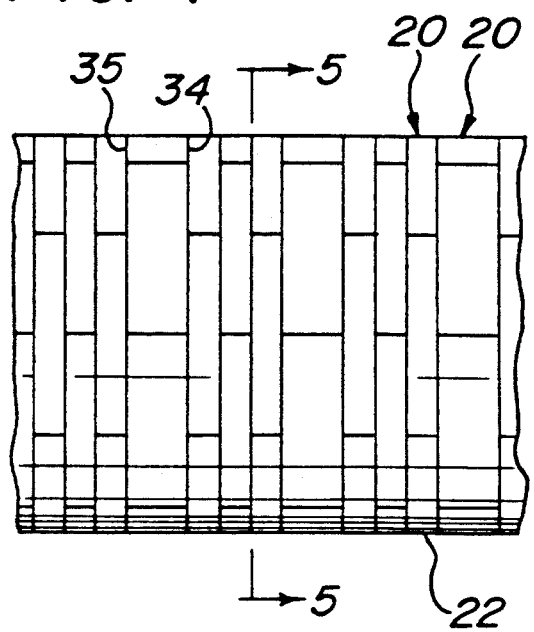
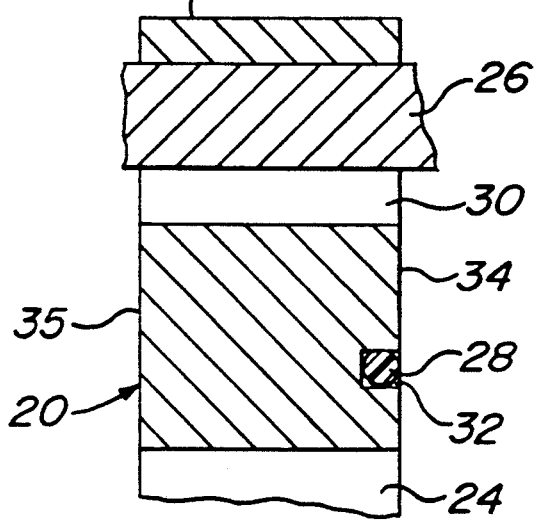
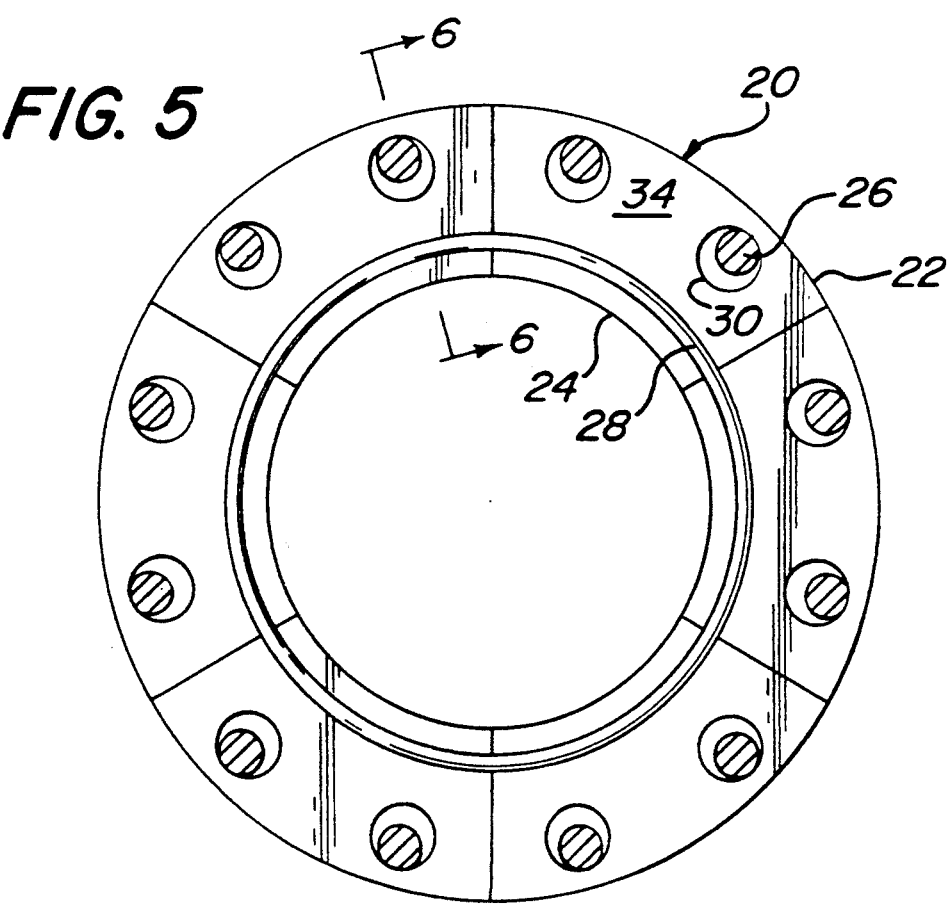

MOLDING DEFORMABLE MATERIALS WITH USE OF VIBRATING WALL SURFACES

FIELD OF THE INVENTION

The present invention relates to a method and apparatus for controlling and/or altering the physical characteristics of a deformable material. Particularly, the invention pertains to a method and apparatus for shaping, and/or directing the flow of, a deformable material, by the implementation of a vibrating wall surface, to control and/or modify the molded product's physical properties. This invention also pertains to a molded product resulting from being subjected to the vibration process as disclosed herein.

BACKGROUND OF THE INVENTION

The processing of deformable materials generally involves the transformation of a starting material (i.e., in a solid state or a liquid state), which is in a random form (e.g., powder, beads, granules, pellets, etc.), into a final or intermediate product having a specific shape, dimensions and properties. Processes useful in the transformation of deformable materials from their initial random form to the form of the final or intermediate product are well known to those skilled in the materials processing industry. For instance, if the deformable material is a plastic, examples of such plastic transformation processes include, but are not limited to: extrusion, transfer molding, calendaring, laminating, thermoforming, injection molding, compression molding, blow molding and the like. As used herein, such transformation processes and/or operations are collectively referred to as "molding" processes. Similarly, the resulting final or intermediate product is referred to as "molded", regardless of the specific transformation process employed in its manufacture. The materials processing industry is abundant with teachings in this field of technology.

Most of the conventional molding processes include at least the following steps: (a) transporting an unmolded, deformable material to a molding device, (b) heating the unmolded, deformable material until it can be deformed to take the geometric configuration of the mold or die, (e) shaping the heated material to the geometric configuration of the mold or die to form a molded product, and (d) cooling the molded product. These steps can be done either in sequence or simultaneously or a combination of both.

In order to produce molded products having a specific geometric configuration, it is generally necessary to employ a mold or die. The primary objective of a mold or die is to shape the deformable material introduced therein. Sometimes, molds and dies have a secondary objective, this being to cool the deformed material therein until it is able to maintain its shape when the molded product is withdrawn therefrom.

The physical properties of a molded product depend, in part, upon the specific molding process conditions and steps employed. It has been observed that different molding processes will often result with the final or intermediate products having different physical properties. For example, the amount of shear stress in a molded product determines, in part, the degree of molecular orientation and crystallization within the molded product. This, in turn, has an affect on the molded product's physical properties.

Since there is a need to be able to produce molded products which have physical properties within particular ranges, if a means can be devised for controlling at least some of these physical properties (e.g., by controlling the degree of shear stress) both the process and the product resulting therefrom will be greatly welcomed in the molding industry.

One method of controlling the amount of shear stress in a molded product (and thereby controlling some of the product's physical properties), is commonly referred to as "flow technology". The concept of "flow technology", as it relates to plastic molding processes, is concerned with the behavior of a deformable plastic material before, or while, it is being introduced into a mold and/or being passed through a die.

It has been discovered that the properties of a final or intermediate molded product depend largely upon how the deformable material flows prior to, and/or while, being subjected to a molding process. For example, two products, having identical dimensions and made from the same basic starting material, but which are molded under different conditions (e.g., different hydrostatic pressures and/or shear stresses) and subjected to different flow patterns, will probably have different physical properties.

This phenomena is due, in part, to the fact that, as a deformable material flows prior to, or while, entering a mold or passing through a die, it is subjected to a shear stress which is commonly referred to herein as "flow shear stress".

Flow shear stress induces molecular orientation in the plastic material (i.e., it results in the macromolecules aligning themselves in the direction of flow). The flow shear stress varies from a maximum level at the outside surface of the flowing deformable material to a minimum level at the center where the material is last to cool.

From the above it can be seen that the manner in which the deformable material flows into a mold or through a die, or prior to being subjected to a specific molding process, is of extreme importance in determining the physical properties of the final molded product due, in part, to the degree of flow shear stress which will be imparted thereto.

If a means can be devised for controlling the degree of molecular orientation resulting from flow shear stress, it would be greatly welcomed in the molding industry since it will enable the manufacturer to have a greater degree of control over the product's final properties.

As is well known in the molding industry, during the compensating phase of a typical injection-molding process, the flow of a deformable material into the mold is generally unstable due to the flow occurring in "rivers" which spread out in a delta-like manner. The first material to freeze off shrinks early in the cycle. By the time the material freezes in these "rivers", the bulk of the material is frozen up and the shrinkage has already occurred. Therefore, the rivers shrink relative to the bulk of the molded article.

Since the rivers are highly oriented, shrinkage can be very high. This, in turn, can result in high degrees of stress inside the molded part which can, for example, be a source of warpage. Accordingly, if a means can be devised which reduces the degree of shrinkage from the "rivers" and, thus, reduces the degree of warpage in the final product, it would also be greatly welcomed in the molding industry.

It has also been discovered that the micro structures and the morphology of a molded product (e.g., molecular orientation, degree of crystallinity, etc.) are greatly influenced by the thermo-mechanical history experienced by a deformable material during its molding process steps. And, as can be expected, the ultimate properties of the molded product are closely related to the deformable material's morphology and micro structure.

Specifically, according to U.S. Pat. No. 4,469,649, which is incorporated herein by reference, the control of a material's transformation process, from its random form to its final molded form, can be made at least partially dependent upon the rheological properties of the plastic material as it is subjected to specific molding techniques.

If a means can be devised to control the micro structures and the morphology of a molded deformable product, it would be greatly welcomed in molding industry.

As can be seen from the above, while molded products (e.g., plastics) play a significant role in our daily lives, and are expected to play an even more important role in our future, there are many problems in the manufacturing of such products which still remain unsolved.

SUMMARY OF THE INVENTION

Accordingly, it is one object of the present invention to provide a means for improving the physical properties of a molded product which has been subjected to a specific molding process by controlling the amount of shear stress within the final or intermediate product.

Another object of this present invention is to provide a new flow technology concerned with the behavior of deformable materials during the transformation process from their initial form to their final molded form.

It is yet another object of the present invention to subject a mold or die surface to a novel vibrational treatment to control the manner in which a deformable material flows into or through the mold or die. This novel vibrational treatment accomplishes at least one of the following objectives: (a) it eliminates at least some of the presence of rivers resulting within the molded product; and/or (b) it minimizes the degree of shrinkage during the solidification stage.

It is even another object of this invention to provide a novel mold or die surface which provides, in a material being molded therein and/or passed therethrough, an optimum degree of orientation through shear plastic yielding occurring during and/or just before the solidification stage.

It is still another object of this invention to provide a novel mold or die surface which can influence the way that a deformable material flows therein or therethrough, thereby altering the physical properties of the molded product.

It is a further object of this invention to provide an extrusion apparatus having the capability of altering the physical properties of a deformable material flowing therethrough.

It is even a further object of this invention to implement the novel mold and/or die surface design disclosed herein with the specific molding technology disclosed in U.S. Pat. No. 4,469,649 in order to improve the physical properties of a molded product by controlling the manner in which a deformable material flows into a mold and/or through a die.

It is still a further object of this invention to implement the novel mold and/or die surface design disclosed herein with the specific molding technology disclosed in U.S. Pat. No. 4,919,870 (also incorporated herein by reference).

These and other objects are met by the present invention, due to the implementation of an apparatus for shaping, and/or directing the flow of, deformable materials, wherein the apparatus comprises a novel vibrating wall assembly having at least one surface which defines a specific geometric shape. In this present invention, the deformable material passes over at least one surface of this novel vibrating wall assembly. By controlling the amount, frequency, and/or amplitude of vibration, the physical properties of the resulting molded product can be controlled and/or altered.

The novel vibrating wall assembly of this present invention comprises the following components:

(a) a plurality of pulsating, polygonally-shaped surface elements which are movable between a resting position and an energized position;

(b) an energizing means for moving at least one of the plurality of pulsating surface elements from its resting position to its energized position, to form an energized surface element;

(c) a biasing means for moving the energized surface element from its energized position back to its resting position; and (d) a linking means for interconnecting the plurality of pulsating surface elements, wherein the linking means allows for the limited pulsating movement of the plurality of pulsating surface elements.

In one embodiment of the present invention, the novel vibrating wall assembly comprises, among other things, a plurality of pulsating, polygonally-shaped surface elements which collectively define at least one surface of the specific geometric shape (e.g., flat, cylindrical, polyhedronal, abstract, etc.) over which the deformable material will pass, when the pulsating surface elements are in their resting position. Accordingly, when one of the pulsating surface elements is in an energized position, a deformation in the surface of the specific geometric shape results. The linking means of this embodiment interconnects the plurality of pulsating surface elements in a manner which allows for their controlled, limited pulsating movement. In another embodiment of the present invention, the novel vibrating wall assembly comprises, among other things, a plurality of pulsating, polygonally-shaped surface elements and at least one non-pulsating, polygonally-shaped surface element. Here, the plurality of pulsating surface elements and the at least one non-pulsating surface elements collectively define at least one surface of the specific geometric shape (e.g., flat, cylindrical, polyhedronal, abstract, etc.) over which the deformable material will pass, when the plurality of pulsating surface elements are in their resting position. Moreover, the linking means of this latter embodiment interconnects the plurality of pulsating surface elements and the at least one non-pulsating surface element together. Here, as with the former embodiment, the linking means still must allow for the controlled, limited pulsating movement of the pulsating surface elements.

Other objects, aspects and advantages of the present invention will become more apparent to those skilled in the art upon reading the following detailed description, when considered in conjunction with the appended claims and the accompanying drawings briefly described below.

BRIEF DESCRIPTION OF THE DRAWINGS

FIG. 1 is a side, planar view of a surface element useful in the design of a vibrating wall assembly in accordance with the present invention.

FIG. 2 is a cross-sectional view of the surface element illustrated in FIG. 1 taken along line 2—2.

FIG. 3 is a top isometric, partially sectionalized view of a vibrating wall assembly in accordance with the present invention.

FIG. 4 is a side, planar view of a cylindrical vibrating wall assembly in accordance with one embodiment of the present invention.

FIG. 5 is a back view of the cylindrical, vibrating wall assembly illustrated in FIG. 4 taken along line 5—5.

FIG. 6 is a side, cross-sectional view of a surface element used in the cylindrical vibrating wall assembly illustrated in FIG. 5 taken along line 6—6.

DETAILED DESCRIPTION OF THE INVENTION

Figure 7:
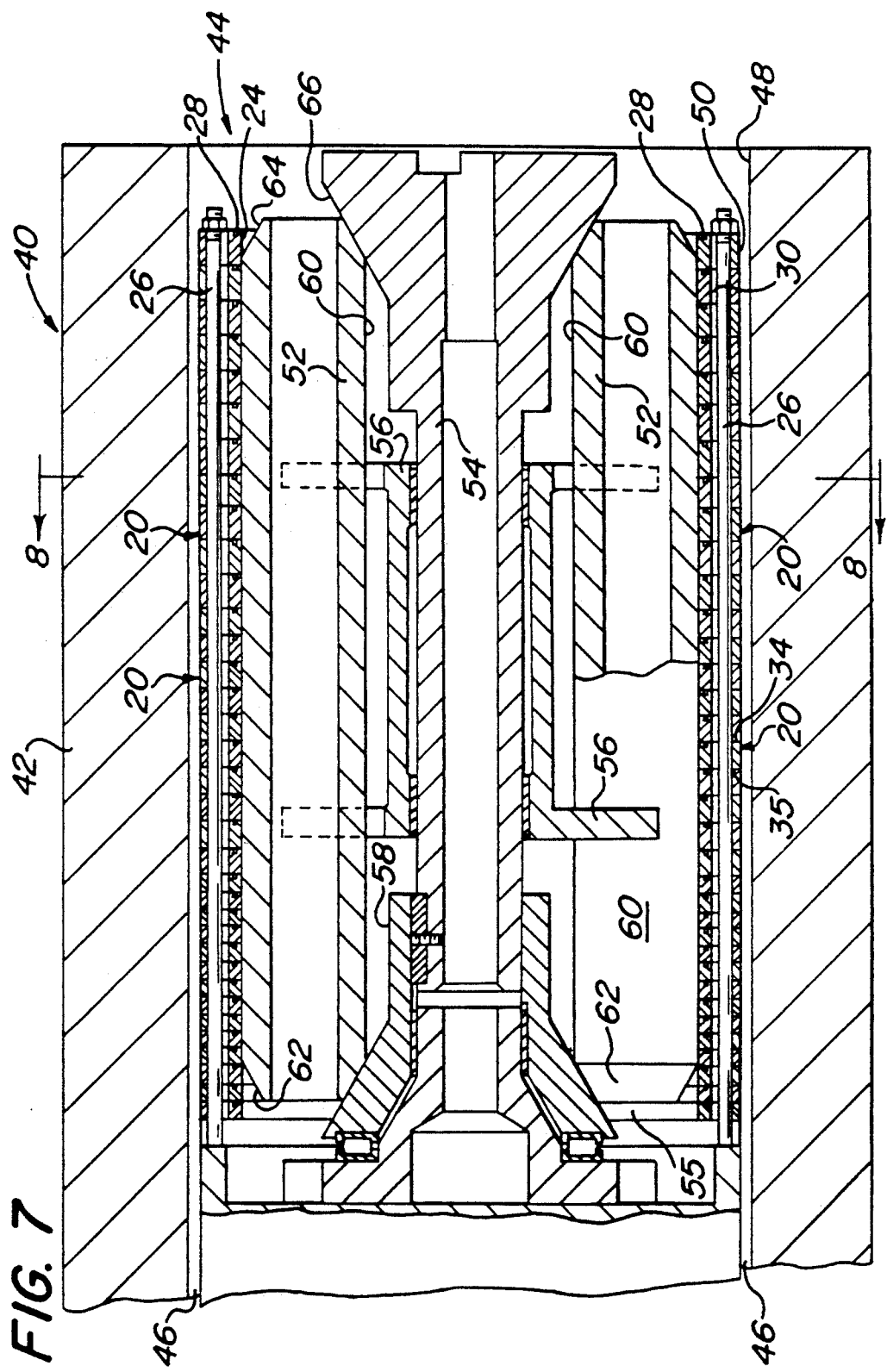
FIG. 7 is a side, cross-sectional view of a cylindrical vibrating wall assembly illustrating one example of an energizing means, a biasing means and a linking means encompassed by the present invention.

The present invention provides a novel apparatus which is useful for shaping, and/or directing the flow of, deformable materials. This novel apparatus comprises at least one vibrating wall assembly which defines at least one of the surfaces of a specific geometric shape over which a deformable material will pass.

Specifically, the at least one surface of a specific geometric shape over which the deformable material will pass, which is defined by the vibrating wall assembly of the present invention, is at least partially made up of a by plurality of interwoven pulsating surface elements. These interwoven surface elements are also referred to herein as "bricks". It is also within the scope of this invention for the vibrating wall assembly to also include at least one non-pulsating surface element.

The specific geometric shape defined by the vibrating wall assembly of the present invention can be employed as at least part of a surface of a molding apparatus over which a deformable material will pass. For example, the vibrating wall assembly can define at least part of a surface of a mold, a die, and/or a transfer channel to and/or from the mold or die.

When practicing this invention, the pulsating surface elements are put into a periodic pulsating motion via an energizing means and a biasing means. While the surface elements are pulsating, a deformable material passes thereover.

Any suitable energizing and/or biasing means can be employed to cause these surface elements to pulsate. Examples of such suitable means include, but are not limited to: mechanical means, electrical means, magnetic means, electro-magnetic means, hydraulic means, pneumatic means, and the like, and/or any combination thereof. Specific examples of energizing and/or biasing means will be discussed later in more detail.

One of the many features of the present invention comprises the creation of novel vibrating wall surfaces which can be employed in an apparatus suitable for shaping, and/or directing the flow of, deformable materials. These novel vibrating wall surfaces define at least one surface of a specific mold or die geometric shape (e.g., flat, cylindrical, polyhedronal, abstract, etc.). These novel vibrating wall surfaces can have any desired texture and/or geometric shape. Generally, if these vibrating wall surfaces are employed as part of a specific mold or die, their shape will depend largely upon the desired shape of the molded product. Similarly, their surface texture will also depend largely upon the desired texture of the molded product.

In accordance with the present invention, the novel vibrating wall assembly comprises a plurality of individual pulsating surface elements. These pulsating surface elements are movable between a resting position and an energized position. This pulsating movement results in the formation of a novel vibrating wall assembly. Since the novel vibrating wall assembly of the present invention is employed in an apparatus which is suitable for shaping and/or directing the flow of deformable materials, and since the novel vibrating wall assembly also defines at least one surface of a specific geometric configuration over which the deformable material will pass, through this pulsating action, periodic or static pressure is exerted on the deformable material passing thereover.

As stated earlier, the novel vibrating wall assembly of the present invention comprises, among other things, a plurality of pulsating, polygonally-shaped surface elements which collectively define at least one surface of a specific geometric configuration when the plurality of pulsating surface elements are in their resting position. However, when at least one of these plurality of pulsating surface elements is in its energized position, a deformation in the surface of the specific geometric configuration results.

In addition to the plurality of pulsating surface elements, it is also within the scope of this invention for the novel vibrating wall assembly to optionally comprise at least one non-pulsating, polygonally-shaped surface element. In this latter embodiment, the plurality of pulsating surface elements and the at least one non-pulsating surface element collectively define at least one surface of a specific geometric shape when the plurality of pulsating surface elements are in their resting position.

The pulsating and/or non-pulsating surface elements useful in the practice of this invention can have any suitable size, shape and geometric configuration which allows for the limited pulsating movement of pulsating surface elements. For example, if the surface defined by the vibrating wall assembly is planar, the plurality of pulsating and/or non-pulsating surface elements making up this particular vibrating wall assembly can have a square and/or rectangular configuration. Similarly, if the surface defined by the vibrating wall assembly is curved, the plurality of pulsating and/or non-pulsating surface elements making up this particular vibrating wall assembly can have a concave and/or convex configuration (for an illustration of this latter example, see FIG. 1).

Since the geometric configurations of molds, dies and/or transfer channels employed in today's molding industry are infinite, so are the number of different sizes, shapes and geometric configurations of the plurality of pulsating and/or non-pulsating surface elements encompassed by the present invention.

When selecting the specific geometric shape of the pulsating and/or non-pulsating surface elements, it is important to take into consideration the flowability of the deformable material which will pass over the vibrating wall assembly. Specifically, in most instances, it would not be desirable to have the flowable material seeping into the joints located between two adjacent surface elements. One method of overcoming this problem is by designing the surface elements such that, due to the flow rate and viscosity of the deformable material, the material does not seep into these joints. This may, however, hamper the mobility of the pulsating surface element in respect to one another. If so, another way of overcoming this problem is by placing a coating material or layer (e.g., a film) over the surface of the vibrating wall assembly. If employed, this coating must allow the surface elements to pulsate. Specifically, the coating should have a thickness and resiliency associated therewith such that it can withstand the pulsating effect of the vibrating wall assembly while still transmitting this pulsating effect to the material passing thereover.

Any suitable coating material can be employed. The specific coating material will depend, in part, upon the desired function sought thereby. For example, if a non-stick coating material is desired, polytetrafluoroethylene and/or polybichloril-difluoril-ethylene can be used.

The surface elements of the present invention can be made from any suitable material known to those skilled in the art. The specific selection of a suitable material from which to make the surface elements of the present invention will depend, in part, upon the specific temperature, pressure and vibrational conditions to which they are subjected by the specific molding process employed. For example, if the deformable material being shaped, or whose flow is being directed, is a plastic, a suitable composition from which that surface of the pulsating and/or non-pulsating surface elements which contacts the plastic can be made is a nickel-chrome steel.

In addition to a plurality of pulsating and/or non-pulsating surface elements, the vibrating wall assembly of the present invention also comprises a means for moving at least one of the plurality of pulsating surface elements from its resting position to an energized position. Generally, the energizing means exerts a positive and/or negative pressure onto at least one of the pulsating surface elements such that a deformation is observed in the surface of the specific geometric configuration defined by the vibrating wall assembly. This positive and/or negative pressure is, preferably, perpendicular to the flow of deformable material over the novel vibrating wall assembly.

Any suitable means can be employed for moving at least one of the plurality of pulsating surface elements from its resting position to an energized position. Examples of suitable energizing means which can be employed when practicing this invention include, but are not limited to: mechanical energizing devices, electric energizing devices, magnetic energizing devices, electromagnetic energizing devices, hydraulic energizing devices, pneumatic energizing devices, and the like and/or any combination thereof.

Figure 13A:
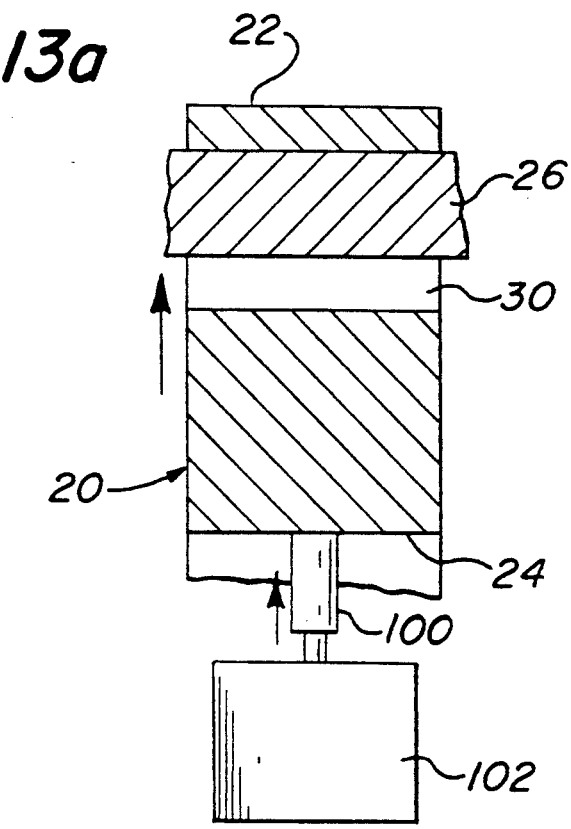
FIG. 13a is a side, cross-sectional view of a surface element with an energizing means.

For example, in FIG. 13a, rod 100 pushes against the inside wall surface 24 of surface element 20. This pushing action energizes the surface element and results with its upper wall surface 22 moving from its resting position to its energized position.

The movement of rod 100 is due to energizing means 102. This energizing means can be an electrical energizing device, a magnetic energizing device, an electromagnetic energizing device, a hydraulic energizing device, a pneumatic energizing device, and the like, and/or any combination thereof. Moreover, it can also be a solenoid unit or a piezoelectric unit.

Figure 8:
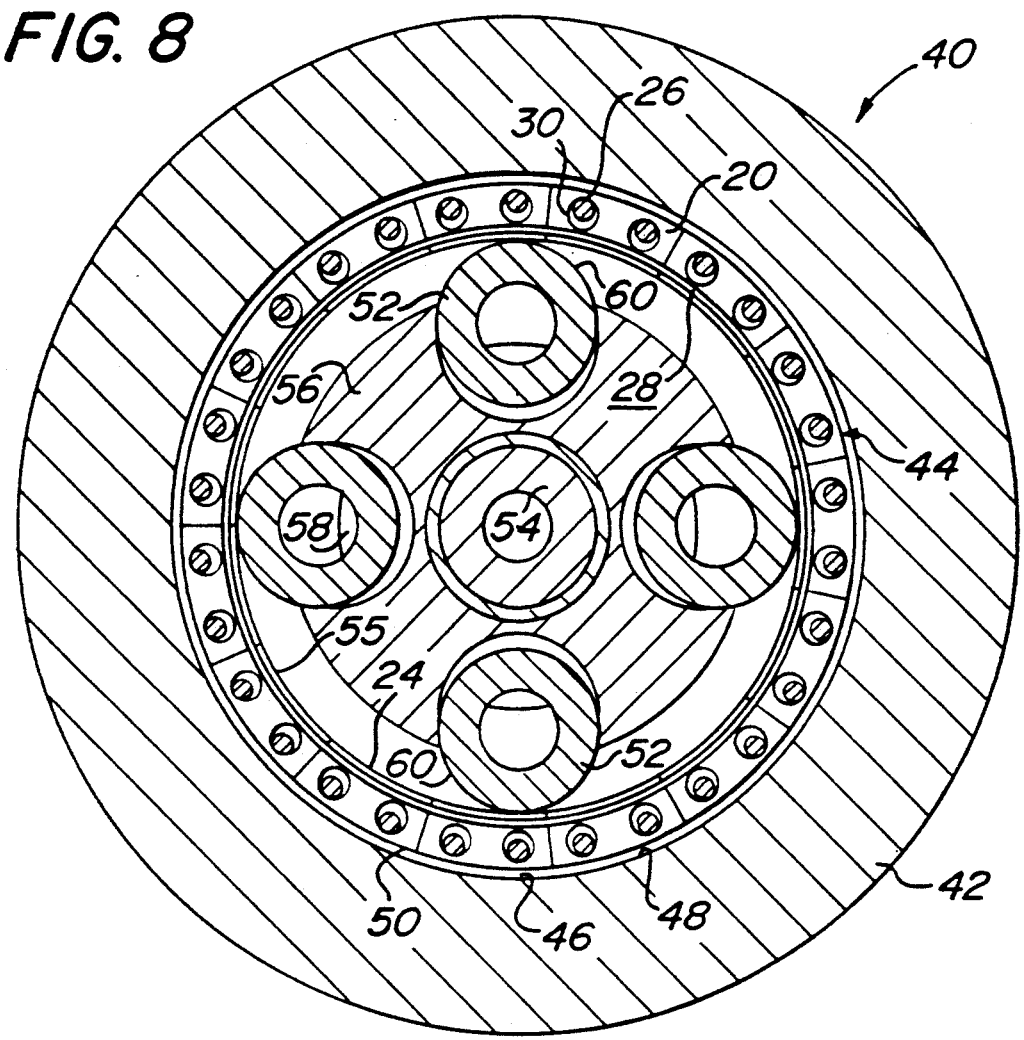
FIG. 8 is a front, cross-sectional view of the cylindrical vibrating wall assembly illustrated in FIG. 7 taken along line 8—8.
Figure 11:
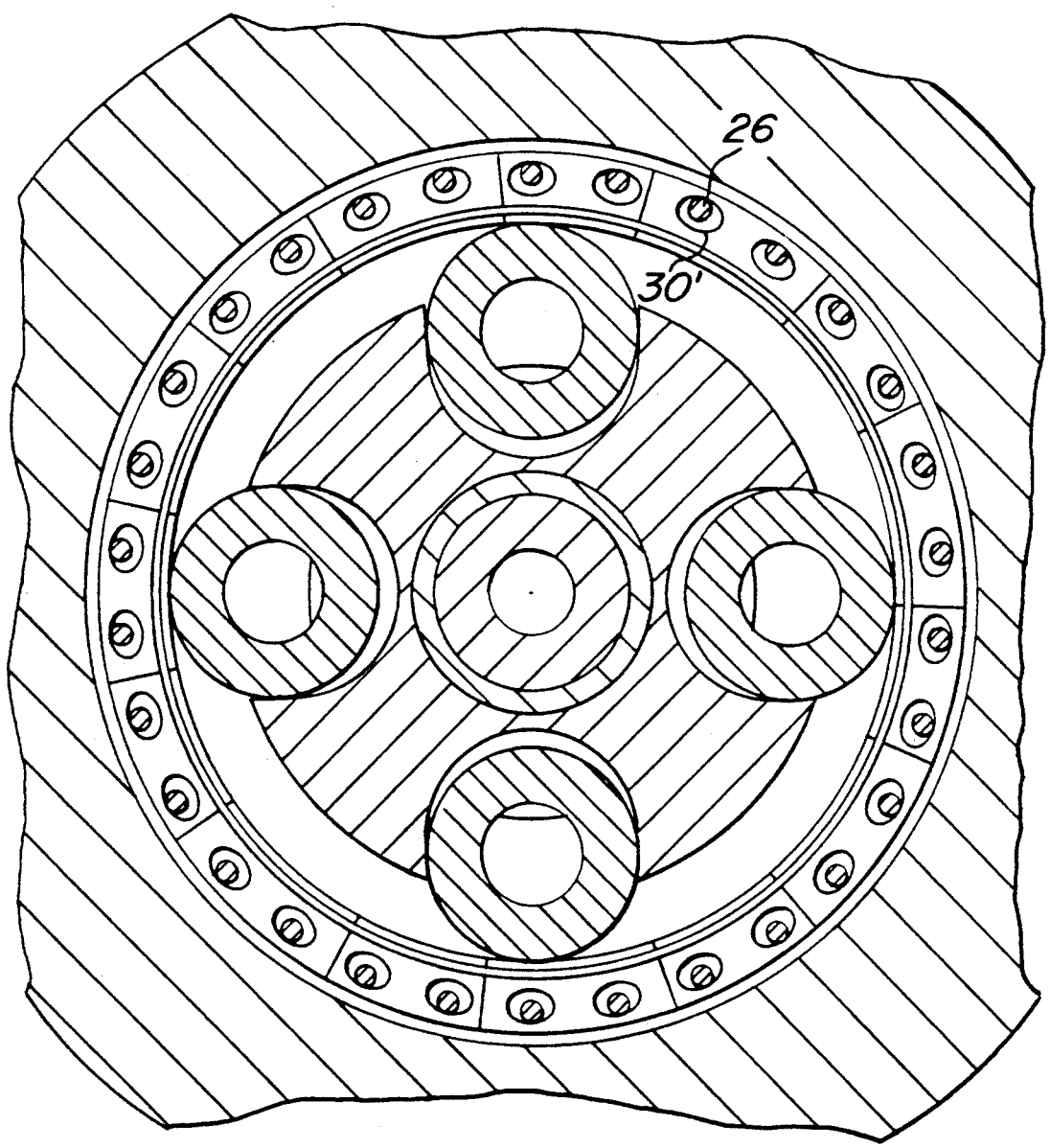
FIG. 11 is a side, cross-sectional view of a cylindrical vibrating wall assembly illustrating one example of an energizing means, a biasing means and a linking means encompassed by the present invention.

In the specific embodiment illustrated in FIGS. 7, 8 and 11 of the present invention, the outside wall surface of the novel vibrating wall assembly defines the inside wall surface of an extrusion die. There, the energizing means employed comprises a series of longitudinally-oriented push rods which exert a positive pressure on the inside wall surface of the vibrating wall assembly. This positive pressure temporarily energizes the pulsating surface element. When the push rods cease to contact the underside of those particular pulsating surface elements, the biasing means returns the energized elements back to their original resting position. Depending on the viscosity and pliability of the material flowing thereover, this material may also contribute to returning energized elements back to their original resting position. This specific process will be described later in more detail.

It is also within the scope of this invention to employ a solenoid-type unit and/or a piezoelectric unit as an energizing means (see, for example, FIG. 13a). Here, the solenoid-type and/or piezoelectric unit(s) would be attached to at least one of the pulsating surface elements. Then, by energizing the unit(s), the pulsating surface element(s) will also be energized.

The vibrating wall assembly of the present invention also comprises a means for moving at least one of the pulsating surface elements from its energized position back to it original resting position. Generally, this biasing means exerts a pressure opposite to that of the energizing means, such that the deformation observed in that surface of the specific geometric configuration defined by the vibrating wall assembly, is removed.

Any suitable biasing means can be employed to return a pulsating surface element from its energized back to its original resting position. Examples of suitable biasing means which can be employed when practicing this invention include, but are not limited to: mechanical biasing devices (e.g., springs, bands, cables, O-rings, etc.), electrical biasing devices, magnetic biasing devices, electro-magnetic biasing devices, hydraulic biasing devices, pneumatic biasing devices, and the like, and/or any combination thereof.

Figure 13B:
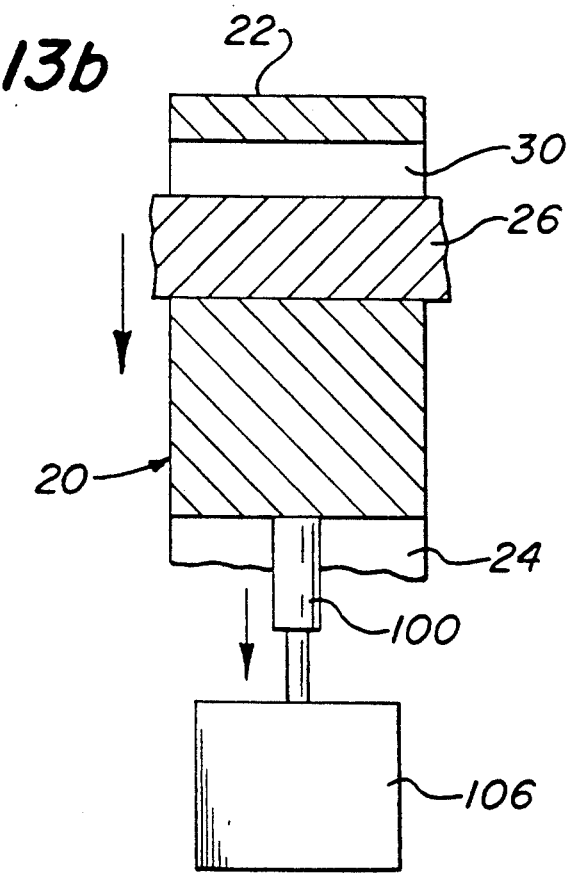
FIG. 13b is a side, cross-sectional view of a surface element with a biasing means.

For example, in FIG. 13b rod 100 pulls surface element 20 from its energized position to its resting position by biasing means 106. This biasing means can be an electrical biasing device, a magnetic biasing device, an electromagnetic biasing device, a hydraulic biasing device, a pneumatic biasing device, and the like, and/or any combination thereof.

It is also within the scope of this invention for the energizing means and the biasing means to be a single unit. For example, in FIGS. 13a and 13b, when rod 100 is moving in an upward direction, it is pushing surface element 20 from its resting position to its energized position. On the other hand, when rod 100 is moving in a downward direction, it is pulling surface element 20 from its energized position to its resting position.

In the specific embodiment of the vibrating wall assembly illustrated in FIGS. 3, 5–8 and 11 of the present invention, the biasing means employed comprises a continuous, resilient band which is fitted into a camphor or groove notched into the side walls of radially-adjacent surface elements. This specific band and groove configuration tightly holds those surface elements within a single radial plane in their resting position when no energizing force is applied thereto. However, when an energizing force is exerted onto any one of the pulsating surface elements via any suitable energizing means (e.g., push rods), this strains the biasing means. Accordingly, when the energizing force is removed, the biasing means seeks to remove the strain by returning the energized surface element back to its original resting position. As stated above, this specific process will be described later in more detail.

Since the vibrating wall assembly of the present invention is comprised of a plurality of pulsating and/or non-pulsating surface elements, this wall assembly also includes means for interconnecting these surface elements together such that they collectively define at least one relatively continuous surface of a specific geometric configuration. The linking means useful in practicing the present invention must allow for the limited pulsating movement of the pulsating surface elements. It is also desirable, although not necessary, for the linking means to interconnect the plurality of pulsating and/or non-pulsating surface elements together such that substantial seepage of deformable material into the joints located between two adjacent surface element does not result.

Any suitable linking means can be employed when practicing this invention which has associated therewith the aforementioned characteristics. Examples of suitable linking means include, but are not limited to: rods, cables, plates, bands, tubes, and the like, and/or any combination thereof.

Figure 14A:
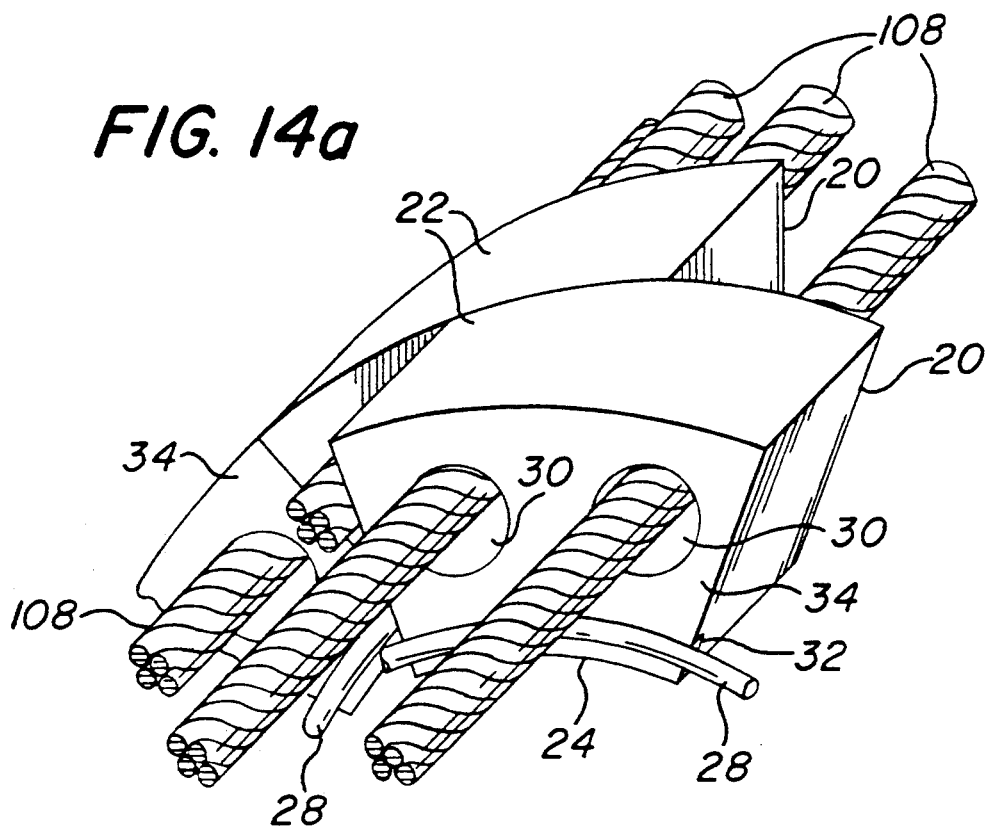
FIGS. 14a, 14b and 14c are top isometric, partially sectionalized views of a vibrating wall assembly wherein the linking means are cables, tubes and plates, respectively.
Figure 14B:
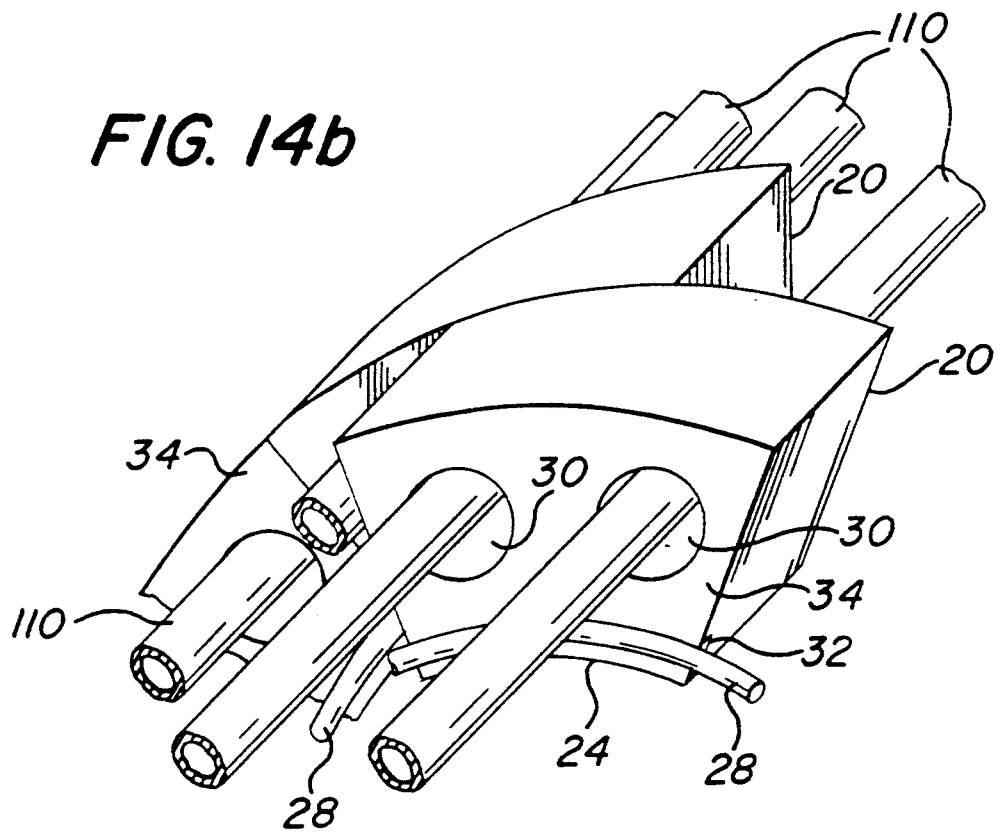
Figure 14C:
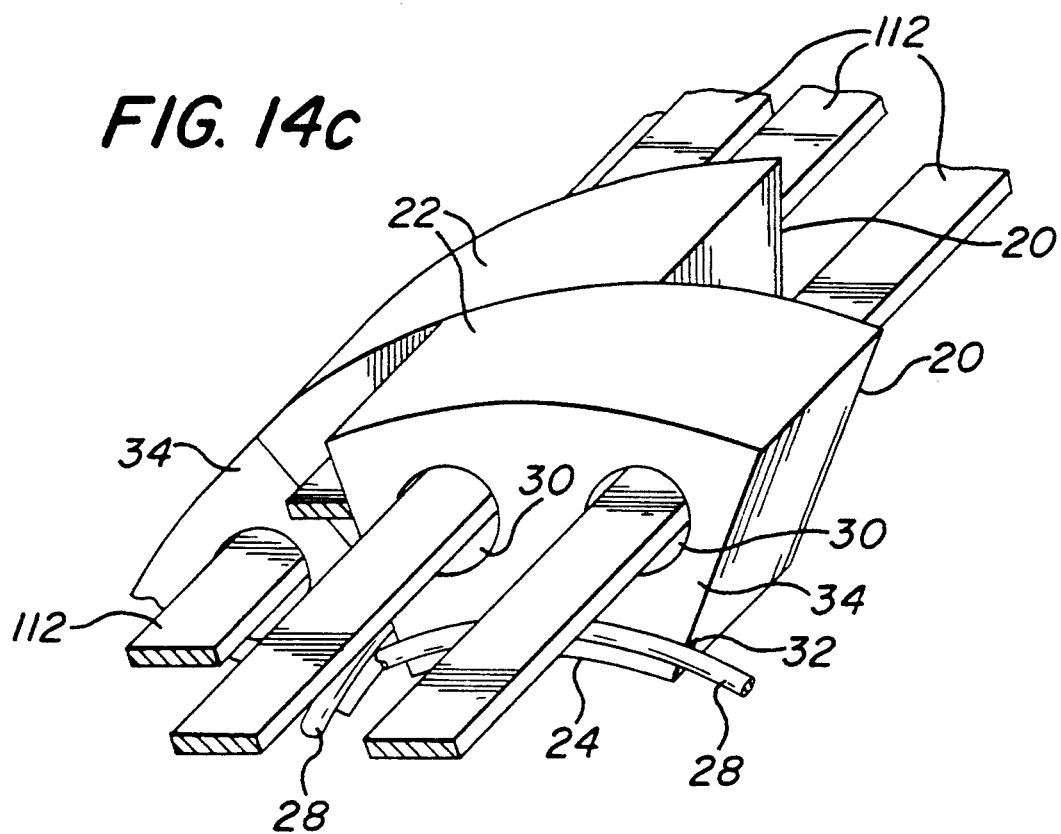

FIGS. 14a, 14b and 14c illustrate embodiments of the invention wherein the linking means are cables, tubes and plates, respectively.

In the specific embodiment of the vibrating wall assembly illustrated in FIGS. 3, 5–8 and 11 of the present invention, the linking means employed comprises a series of longitudinally-oriented rods which pass through corresponding openings defined through longitudinally-adjacent surface elements. While these openings can have any suitable configuration (e.g., circular, elliptical, elongated, square, rectangular, triangular, polygonal, etc.), they must allow for the limited pulsating movement of the pulsating surface elements while the linking means is passed therethrough.

The figures of the present invention illustrate, among other things, specific pulsating surface elements, specific energizing means, specific biasing means and specific linking means, as well as a specific implementation of a novel vibrating wall assembly in an extrusion molding apparatus. As stated earlier, any suitable surface element, energizing means, biasing means and/or linking means can be employed when practicing the present invention. Also as stated earlier, the novel vibrating wall assembly of the present invention can be employed with any suitable apparatus useful for shaping, and/or directing the flow of, deformable materials. Such suitable vibrating wall assembly components and uses will be apparent to those skilled in the art once reading the description of the present invention as set out herein.

Referring now to FIG. 1, this illustrates a front planar view of a pulsating surface element employed in the fabrication of a cylindrical vibrating wall assembly useful as part of an extrusion die. FIG. 2, on the other hand, is a cross-sectional view of the surface element illustrated in FIG. 1 taken along line 2—2.

The surface element illustrated in FIGS. 1 and 2 is generally represented by reference numeral 20. Surface element 20 has an outer wall surface 22, an inner wall surface 24 and opposing side wall surfaces 34 and 35.

In practice, a plurality of pulsating surface elements are placed adjacent one another until their collective upper lower surface create a vibrating wall assembly having at least one surface which defines a specific geometric configuration over which a deformable material will pass. An example of a plurality of surface elements collectively employed to form a vibrating wall assembly having a cylindrical configuration is illustrated in FIGS. 4, 5, 7, 8 and 11. These Figures will be discussed later in more detail.

As stated earlier, the joints located between two side walls of adjacent surface elements should be: (a) tight enough such that a substantial amount of the deformable material being molded does not flow therebetween and (b) loose enough such that the pulsating surface elements can pulsate. As also stated earlier, while the former characteristic is not necessary, it is desirable.

The tightness/looseness of these joints will depend, in part, on the following variables: the viscosity of the deformable material passing over the vibrating wall assembly, the specific apparatus into which the vibrating wall assembly will be incorporated, the desired shape and configuration of the vibrating wall assembly, the specific energizing means employed, the specific biasing means employed, and the like. As for the viscosity, U.S. Pat. No. 4,469,649 states that it may be a function of the vibrating walls' pulsating frequency. Accordingly, the preferred surface element design employed will depend largely upon the specific parameters selected by the one practicing this invention.

As stated earlier, one of the many features of the present invention is that it provides a novel vibrating wall assembly which can exert a periodic positive and/or negative pressure on a deformable material passing thereover. The manner in which this pressure is exerted onto the deformable material in accordance with the present invention is by the limited, pulsating movement of individual surface elements. In one preferred embodiment, this pulsating movement is in a direction which is generally perpendicular to the flow of the deformable material flowing thereover.

In another preferred embodiment the pulsating elements are tilted in the direction of flow. Here, the pulsating elements would also result in pushing the material passing thereover. And, depending on the specific factors, these tilted pulsating elements can even stretch the material flowing thereover.

When practicing the present invention, energizing means is employed for moving the pulsating surface elements from their original resting position to an energized position. This energizing means can be in either direct or indirect contact with the individual pulsating surface elements.

Referring to the specific surface element design illustrated in FIGS. 1-6 of the present invention, the deformable material will come into contact with either the surface element outer wall 22 or the surface element inner wall 24, depending upon the specific molding process. In this embodiment, the energizing means is generally in either direct or indirect contact with that surface element wall which is opposite the wall which comes into contact with the deformable material.

An example of such an embodiment is illustrated in FIGS. 7, 8 and 11 of the present invention. In those specific embodiments, the deformable material comes into contact with surface element outer wall 22. Accordingly, the energizing means is in contact with surface element inner wall 24. These Figures will be discussed later in more detail.

As stated earlier, the surface elements of the present invention also have associated therewith a linking means for interconnecting the individual surface elements to one another. Referring to the specific surface element design illustrated in FIGS. 3, 5-8 and 11 of the present invention, the linking means illustrated therein comprises a series of longitudinally-oriented rods 26 and radially-oriented bands 28.

Specifically, in the embodiment illustrated in FIGS. 3, 5-8 and 11, rods 26 are dimensioned to transversely pass through corresponding openings 30 defined through longitudinally-adjacent surface elements 20. This is best illustrated by FIGS. 3 and 7.

In these Figures, rods 26 are positioned in a direction which is generally parallel to the direction of flow of the deformable material over the vibrating wall assembly. One of the purposes of rods 26 is to longitudinally interconnect the plurality of surface elements.

As can be seen by referring specifically to FIGS. 3 and 4, the positioning of longitudinally-adjacent surface elements can be staggered. By employing this design technique, it is possible for rods 26 to afford an even greater degree of interconnection between longitudinally-oriented surface elements.

In the embodiment illustrated in FIGS. 3, 5-8 and 11 of the present invention, it can be seen that the diameter and geometric shape of rods 26 are such that the pulsating surface elements can move from their resting position to their energized position when a positive or negative pressure is exerted onto their inner wall 24. By controlling the size and shape of rods 26, and/or openings 30 through which they pass, the amplitude of pulsation can also be controlled.

In FIGS. 3 and 5-8 of the present invention, rods 26 and openings 30 have the same cross-sectional geometric shape (i.e., circular). Therefore, since the diameter of rods 26 is less than that of opening 30, limited movement of the pulsating surface elements 20 is possible when a positive or negative pressure is exerted by an energizing means onto the pulsating surface elements inner wall 24.

It should be noted, however, that openings 30 need not necessarily have the same cross-sectional geometric shape as their corresponding linking means. Rather, opening 30 can have any suitable shape which: (a) is dimensioned to receive the specific linking means employed, (b) enables the interconnection of adjacent surface elements and (c) enables adjacent, interconnected pulsating surface elements to move from their original resting position to their energized position while they are linked together.

An example of an embodiment where the holes passing through the surface elements do not have the same cross-sectional geometric shape as their corresponding linking means is illustrated in FIG. 11 of the present invention. There, the linking rods 26 have a circular cross-sectional shape, while the openings 30' have an elliptical cross-sectional shape. Such a design is useful for aiding in the alignment of corresponding holes passing through longitudinally-adjacent surface elements, especially if these surface elements are staggered (see, FIGS. 3 and 4) or different lengths (see, FIG. 11).

Moreover, instead of being elongated in the direction of flow, the opening 30 can be elongated in a perpendicular or slightly tilted orientation. Also, opening 30 can be designed such that, while a generally perpendicular movement of the pulsating elements is possible, lateral movement of rods 26 within the holes are minimized, thus reducing secondary noise vibration.

Rods 26 can be made from any suitable material which can withstand the temperature, pressure and vibrational conditions of the specific molding process into which the novel vibrating wall assembly is being incorporated. Any such suitable material known to those skilled in the art can be employed. The preferred composition of rods 26 will depend, in part, upon the specific deformable material passing over the vibrating wall assembly and specific molding process conditions being employed.

As stated earlier, in the embodiment illustrated in FIGS. 3, 5-8 and 11 of the present invention, the specific linking means employed also comprises radially-oriented coiled wire springs 28. In the embodiment illustrated therein, one of the functions of spring 28 is to interconnect radially-adjacent surface elements.

Specifically, as can be seen in FIGS. 3 and 6, spring 28 is dimensioned to fit into a notch or groove 32 defined in the side wall 34 of at least two radially-adjacent surface elements. Notch 32 is positioned along surface element side wall 34 such that it is aligned with similar notches defined in radially-adjacent surface elements.

Figure 15:
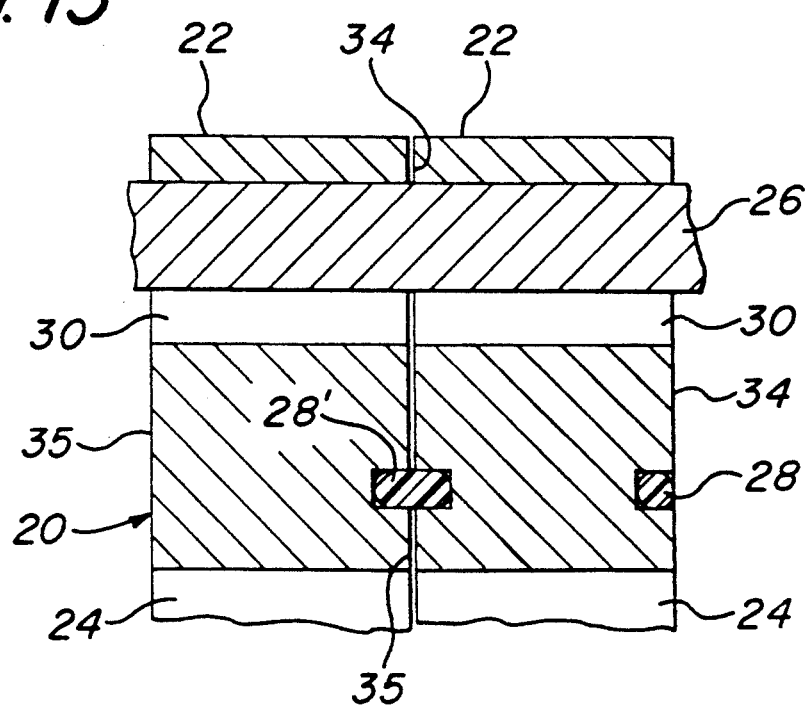
FIG. 15 is a side, cross-sectional view of adjacent surface elements illustrating an embodiment of the invention wherein the biasing means and linking means are the same unit.

It should be noted, however, that it is within the scope of this invention for spring 28 to be fitted not only in notches defined in radially-adjacent surface elements, but also in corresponding notches defined in longitudinally-adjacent surface elements, FIG. 15 illustrates an embodiment of the invention wherein the biasing means and the linking means is a single unit. For example, spring 28 protrudes beyond surface element side wall 34, a corresponding receiving notch can be located in the surface element side wall which abuts against side wall 34. In this latter embodiment, spring 28' would be useful for interconnecting radially-adjacent surface elements, as well as longitudinally-adjacent surface elements.

The vibrating wall assembly of the present invention also comprises a biasing means for returning a pulsating surface element from its energized position back to its original resting position. In the embodiment illustrated in FIGS. 3, 5-8 and 11, spring 28 is the specific biasing means employed.

Specifically, in these Figures, spring 28 has two major functions. These are as follows: (a) linking together radially-adjacent surface elements to create a chain of continuity among their respective motion, and (b) returning the pulsating surface elements back to their original resting position after being energized.

Spring 28 can be made from any suitable material which can withstand the temperature, pressure and vibrational conditions of the specific molding process into which the vibrating wall assembly is being incorporated. Moreover, if spring 28 is doubling as the biasing means, it must also have associated therewith a degree of resiliency, such that it can return the pulsating surface element(s) from their energized position back to their original resting position.

Any such suitable material known to those skilled in the art can be employed. The preferred composition of spring 28 will depend, in part, upon the specific deformable material passing over the vibrating wall assembly, the specific molding process conditions being employed and the specific energizing means being employed.

Referring now to FIG. 4, this is a side planar view of a cylindrical vibrating wall assembly made from a plurality of surface elements in accordance with the present invention. These surface elements are radially interconnected by springs 28 and longitudinally interconnected by rods 26 (see, for example, FIGS. 5 and 6). The important thing to note about FIG. 4 is that it demonstrates that the width of surface elements 22 can vary according to a predetermined configuration. This can enable the user to control certain rheological properties of the deformable material passing over the vibrating wall assembly.

Moreover, it is also within the scope of this invention to vary the radial length of the individual surface elements (see, for example, FIG. 11). Here, special care needs to be taken such that the corresponding openings in longitudinally-adjacent surface elements, line-up in a manner which permits the longitudinally-oriented linking means to pass therethrough. In FIG. 11, this problem is solved by employing elliptically-shaped openings 30'.

While the vibrating wall assembly illustrated in FIGS. 4, 5, 7, 8 and 11 is cylindrical, it should be noted that the present invention can be applied to form a vibrating surface having any geometric configuration. For example, the surface elements of the present invention can be employed to form vibrating wall structures having any of the following configurations: flat, concave, convex, multifaceted, rectangular, square, triangular, polyhedronal, elliptical, etc., and the like.

Moreover, in FIGS. 4, 5, 7, 8 and 11, the collective inner wall surfaces 24 and outer wall surface 22 of the individual surface elements making up the vibrating wall assembly have the same configuration (i.e., circular). However, when practicing the present invention, these wall surfaces need not be identical. For example, it is within the scope of this invention for the outer wall of a particular surface element to be concave, while its opposing inner wall is convex.

What follows is a detailed explanation of one specific embodiment of the present invention wherein the vibrating wall assembly is incorporated as an integral part of a pipe extrusion apparatus. It should be noted, however, that the scope of this invention goes far beyond the extrusion of pipes and the following specific example.

In practice, the individual surface elements are fitted together such that their collective upper or lower surface define a specific design and/or geometric configuration. In the specific embodiment illustrated in FIGS. 7 and 8, the plurality of surface elements are interconnected to define a cylindrical vibrating wall assembly which is incorporated in an extrusion die apparatus.

Referring now to FIG. 7, this is a side, partially sectionalized view of an extrusion die generally referred to as item 40. Extrusion die 40 comprises a cooling jacket 42 and a vibrating wall assembly generally referred to as item 44. The deformable material being molded by extrusion die 40 will pass through the gap 46 defined between cooling jacket inside wall surface 48 and vibrating wall assembly outside wall surface 50.

Vibrating wall assembly 44 comprises a plurality of pulsating surface elements 20, linking rods 26 and biasing springs 28. The specific energizing means employed in this embodiment comprises a series of longitudinally-oriented push rods 52, energizing drive shaft 54, drive shaft cage 56 and tapered drive wheel 58.

In practice, the outside wall surface 60 of push rods 52 pushes against the inside wall surface 24 of the indi7vidual surface elements 20. This energizes the particular surface elements and results with their upper wall 22 moving towards the cooling jacket inside wall surface 48. This also puts an outwardly-oriented strain on springs 28.

Push rods 52 are moved around the vibrating wall assembly inside wall surface 55 by cage 56 which is connected to energizing drive shaft 54. In the particular embodiment illustrated in FIGS. 7 and 8, the rotation of push rods 52 is due, in part, to the friction between push rod's upstream tapered end 62 and corresponding tapered drive wheel 58; and the friction between push rod downstream tapered end 64 and corresponding drive shaft downstream tapered end 66.

In practice as the outside wall surface 60 of push rods 52 ride against the inside wall surface 55 of vibrating wall assembly 44, an outwardly-oriented pressure is exerted onto the individual pulsating surface elements 20. This energizes the surface element such that it slightly closes the gap 46 between vibrating wall assembly outside wall surface 50 and cooling jacket inside wall surface 48. This, also places a strain on biasing springs 28.

After push rods 52 pass over a particular set of pulsating surface elements, biasing springs 28 relieves the strain imparted thereto by returning the energized surface elements back to their original starting position.

The frequency at which the pulsating surface elements move from their resting position to their energizing position depends, in part, on the speed of drive shaft 54 and the number of push rods 52.

Since the basic concept behind an extrusion die is the passing of a deformable material through a gap, when practicing the present invention illustrated in FIGS. 7 and 8, it is important to maintain an open gap between vibrating wall assembly outside wall surface 50 and cooling jacket inside wall surface 48. Accordingly, vibrating wall assembly 44 comprises a means for limiting the maximum displacement amplitude for the individual surface elements. This limiting means is rod 26.

Specifically, the clearance between opening 30 and rod 26 determines the maximum displacement amplitude for the individual surface elements 20. Therefore, by making this clearance less than the width of gap 46, gap 46 will remain open throughout the pulsating cycle of the surface elements.

In the embodiment illustrated in FIGS. 7 and 8, the amplitude of pulsation can be controlled by adjusting the length of energizing drive shaft 54. For example, by shortening the distance between drive shaft tapered end 66 and tapered drive wheel 58, push rods 52 are forced in an outwardly direction. This, in turn, increases the amplitude of displacement when push rods 52 roll past the individual pulsating surface element 20.

Since push rods 52 work off the concept of friction, and since they are an integral part of extrusion die apparatus 40, large amounts of heat can build up within the interior-portion of vibrating wall assembly 44. In order to increase the usable life of this vibrating wall assembly, it is desirable to decrease the amount of heat being built up therein. This may be achieved by any suitable means known to those skilled in the art. Examples of such suitable means include, but are not limited to, blowing pressurized air through drive shaft 54 and/or circulating cooling fluids through push rods 52.

Figure 9:
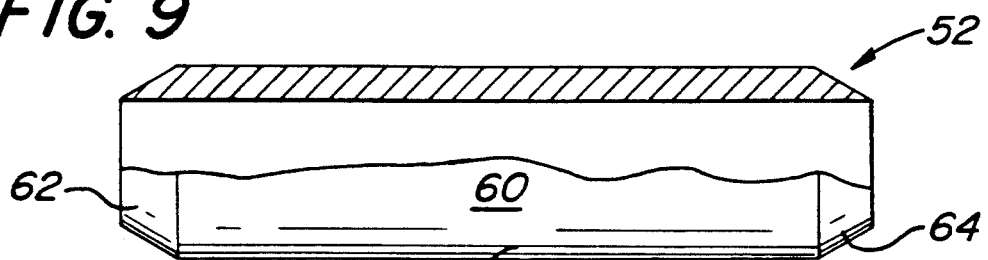
FIG. 9 is a side, partially-sectionalized view of an energizing means encompassed by the present invention.
Figure 10:
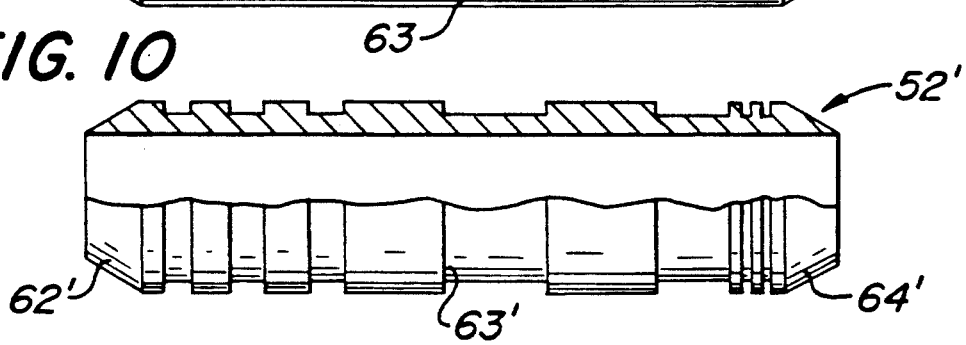
FIG. 10 is a side, partially-sectionalized view of an energizing means encompassed by the present invention.

FIGS. 9 and 10 of the present invention illustrate two, different embodiments of push rod designs. For example, FIG. 9 illustrates a side, partially-sectionalized view of push rod 52 also illustrated in FIGS. 7 and 8. As can be seen push rod 52 comprises a tapered upstream end 62, a cylindrical body portion 63 and a tapered downstream end 64.

FIG. 10, on the other hand, illustrates a push rod 52' which comprises tapered upstream end 62', tapered downstream end 64' and body portion 63'. As can be seen by comparing FIGS. 9 and 10, the body portion 63' of push rod 52' is highly irregular while that of push rod 52 is virtually smooth. Accordingly, when a push rod similar to that illustrated in FIG. 10 is employed, only certain sections of the pulsating surface elements will be energized when the push rod rolls thereover. This will create a different vibrational pattern and thus a different flow pattern.

As stated earlier, it is also within the scope of this invention to have the individual pulsating surface elements constituting the vibrating wall assembly to be energized by electromagnetic, ultrasonic or other mechanical means. Such a process would allow for the individual programming of amplitude and frequency of vibration and temperature associated with each individual pulsating surface element. While such a process eliminates the system of motors and push rods as illustrated in FIGS. 7 and 8, it requires the management of a great deal of coordinated sensors. It should be noted that the breakdown of a wall surface into a series of small surfaces greatly reduces the energy requirements for energizing systems. It is an important feature of the present invention to have been able to decrease the amount of energy required to vibrate a full body, irrespective of its size, by dividing area of force into small zones.

In another embodiment of the present invention, the novel vibrating wall assembly is disk-shaped (not shown). Here, the vibrating wall assembly would be made up from a plurality of concentric surface elements. These can be energized by any suitable means known to those skilled in the art. For example, one method of energizing such a disk-shaped vibrating wall assembly is by rotating thereunder push rods which emerge from the center of the disk assembly and move outwardly toward the disk's periphery.

The vibrating wall assembly of the present invention can also be employed in a system which transports and/or treats extruded plastic pipes coming out from an extrusion die. As demonstrated above, the frequency and amplitude at which the individual surface elements pulsate can be programmed, thus creating the effect of a vibrating wall over which the extruded plastic pipes will pass as they are being cooled.

The novel vibrating wall assembly of the present invention can also be employed to transport liquid-pasty and/or liquid-rubbery matter along distances inside annular or slit dies. By employing the vibrating wall assembly of the present invention, the normal amount of friction encountered at the interface between the outside wall surface of the vibrating wall assembly and the flowing plastic material can be drastically reduced. Moreover, the vibrating effect of the novel wall assembly also provides an advantage in that it subjects the flowing material to a rheological treatment as disclosed in U.S. Pat. No. 4,469,649.

The modifications of the material's physical properties, due to the vibration levels to which it is subjected via the novel vibrating wall assembly, can be beneficially used to increase the material's processability. For example, when the material's yield strength at the corresponding temperature, for the given state of vibration, is greater than zero, but still sufficiently low enough to accommodate the amount of force provided by the local displacement of the pulsating surface elements, cold drawing is performed on the material. This results in a great deal of strain hardening due to orientation in several directions. Here, the part submitted to a longitudinal motion along the vibrating wall assembly is, therefore, transversely hammered by the pulsating surface elements which act like small pins calendaring the material to create improved conditions of orientation by the plastic yielding process.

Figure 12:
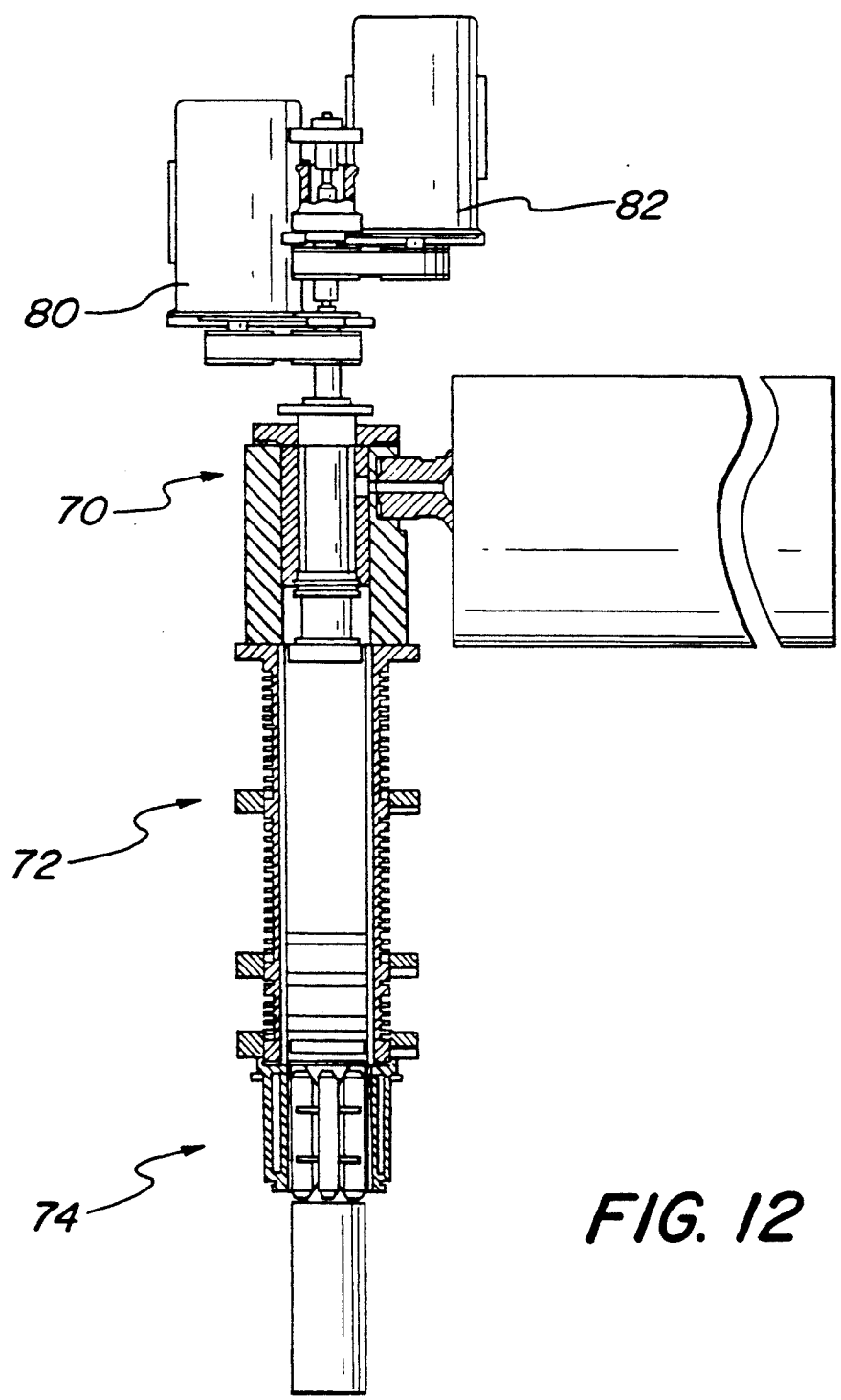
FIG. 12 is a top, partially-sectionalized view of an apparatus useful for the manufacturing of pretreated pipes by an extrusion process.

Referring now to FIG. 12, an embodiment is illustrated wherein the vibrating wall assembly of the present invention is incorporated in an apparatus which produces rheologically treated extruded pipes.

The system illustrated in FIG. 12 comprises three general parts. These are as follows: pipe cross head die generally referred to as 70, preconditioning barrel generally referred to as 72, and rheological cooling unit generally referred to as 74. Rheological cooling unit 74 comprises a vibrating wall assembly similar to that illustrated in FIGS. 7 and 8 described earlier.

The cross head die 70 and flow divider provide a source of a deformable plastic material flowing in a direction which is perpendicular to the extruder alignment. This configuration allows room for the insertion of long concentric shafts rotated independently with motors 80 and 82. Motor 80 is for rotating the drive shaft associated with preconditioning barrel 72, while motor 82 is for rotating the energizing drive shaft associated with the rheological cooling unit 74.

After passing through cross head die 70, the deformable plastic material passes through preconditioning barrel 72. As the deformable plastic material passes through preconditioning barrel 72, its thermal and/or mechanical history is altered to a predetermined level.

Any suitable preconditioning means can be employed in this particular embodiment. One example of such a suitable preconditioning process is described in U.S.

Pat. No. 4,919,870 which, as stated earlier, is incorporated herein by reference. By employing a preconditioning system encompassed by U.S. Pat. No. 4,919,870 as the preconditioning barrel of this particular embodiment, one is able to control the amplitude and frequency of vibration in successive zones which are maintained at a given temperature as the deformable plastic material flows through barrel 72.

It is also within the scope of this invention for preconditioning barrel 72 to comprise temperature control zones, which are submitted to vibration with a set of eccentric masses rotated from the inside of barrel 72. This vibration is, in turn, communicated to the deformable plastic material passing through the annular clearance defined therein.

In practice, the temperature of the outside jacket in preconditioning barrel 72 is often regulated. This allows the programming of a specific temperature for a particular zone therein. If desired, the temperature regulation of preconditioning barrel 72 can be controlled by implementing a series of thermocouples which are connected to controller and commanded by being interfaced with a computer system and for a specific software design. Moreover, it is also possible to regulate the pressure exerted on the flowing material by controlling the amplitude of vibration in each zone through the specific displacement of vibrating surface elements.

In the particular embodiment illustrated in FIG. 12, the drive shaft associated with preconditioning barrel 72 rotates eccentric masses at a predetermined frequency. This dictates the amount of vibrational energy dissipated to the deformable plastic material passing through preconditioning barrel 72.

It should be noted that preconditioning barrel 72 need not subject a mechanical vibration to the deformable plastic material passing therethrough. Rather, preconditioning barrel can be a means for subjecting the deformable plastic material passing therethrough to only temperature conditioning. Moreover, preconditioning barrel 72 can also comprise a vibrating wall assembly similar to that disclosed in FIGS. 7 and 8. Here, it is preferred for the vibrating wall assembly to have a coating material or layer (e.g., a film) thereover to minimize the flow of material between the joints of adjacent surface elements.

It is also within the scope of this invention to have the frequency and amplitude of vibration, in addition to the amount of pressure applied by the extruder, programmed according to the disclosure in U.S. Pat. No. 4,469,649 which, as stated earlier, is incorporated herein by reference.

After passing through preconditioning barrel 72, the now preconditioned, deformable plastic material passes through rheological cooling unit 74. As stated earlier this unit comprises a vibrating wall assembly similar to that illustrated in FIGS. 7 and 8. It should be noted, however, that any vibrating wall assembly encompassed by this invention can be employed herein. The use of the described extrusion process can aid in the production of highly oriented sheets, tubes, rods, etc. by shear yielding resulting from the vibrating surface elements.

As can be seen from the foregoing, by practicing the present invention, the physical properties of a molded product can be controlled and/or altered. Specifically, by passing a deformable material over the vibrating wall assembly of the present invention, the shear stress within the molded product can be controlled and/or altered. Moreover, the implementation of the present invention to a sheet die apparatus having a flat surface rheological cooling unit made up of a vibrating wall assembly as described herein is also encompassed by the present invention.

As also can be seen from the foregoing, if the novel vibrating wall assembly disclosed herein defines at least one surface of a mold or die geometric configuration, it can eliminate at least some of the presence of "rivers" resulting within the molded product. This will, in turn, minimize the degree of shrinkage during the solidification stage.

It is evident from the foregoing that various modifications can be made to embodiments of this invention without departing from the spirit and scope thereof, which will be apparent to those skilled in the art. Thus having described the invention, it is claimed as follows.

That which is claimed is:

1. An apparatus, for shaping, or directing the flow of, deformable materials, comprising at least one vibrating wall assembly having at least one surface which defines a specific mold or die geometric shape over which said deformable material will pass, said at least one vibrating wall assembly comprises:
    (a) a plurality of pulsating, polygonally-shaped surface elements,
        i. wherein each pulsating surface element is movable between a resting position and an energized position,
        ii. wherein said plurality of pulsating surface elements collectively define at least one surface element of a specific mold or die geometric shape when said plurality of pulsating surface elements are each in their resting position,
        iii. wherein a deformation in the surface of said specific mold or die geometric shape defined by the plurality of pulsating surface elements results when at least one pulsating surface element is in its energized position, and
        iv. wherein each pulsating surface element has an opening defined therein which is dimensioned to receive a linking means, and which permits adjacent pulsating surface elements to be interconnected by a linking means;
    (b) an energizing means for moving at least one pulsating surface element from its resting position to its energized position to form an energized surface element;
    (c) a biasing means for moving said energized surface element from its energized position to its resting position; and
    (d) a linking means for interconnecting adjacent pulsating surface elements,
        i. wherein said linking means limits the pulsating movement of pulsating surface elements, and
        ii. wherein said linking means passes through corresponding openings defined in adjacent pulsating surface elements.

2. An apparatus as recited in claim 1 wherein said energizing means comprises at least one means selected from the group consisting of mechanical means, electrical means, magnetic means, electro-magnetic means, hydraulic means, and pneumatic means.

3. An apparatus as recited in claim 1 wherein surface elements which are adjacent to one another are desired such that the deformable material passing thereover will not substantially flow into joints located therebetween.

4. An apparatus as recited in claim 1 wherein a coating material is placed over at least a portion of the surface of said vibrating wall assembly.

5. An apparatus as recited in claim 1 wherein said coating material comprises at least one material selected from the group consisting of polytetrafluoroethylene and polybichloril-difluoril-ethylene.

6. An apparatus as recited in claim 1 wherein said energizing means comprises a series of longitudinally-oriented push rods which exert a positive pressure on at least a portion of the vibrating wall assembly's inside wall surface, said positive pressure temporarily energizes pulsating surface elements within a longitudinal plane of the vibrating wall surface.

7. An apparatus as recited in claim 1 wherein said energizing means comprises at least one means selected from the group consisting of a solenoid unit or a piezoelectric unit.

8. An apparatus as recited in claim 1 wherein said biasing means comprises at least one means selected from the group consisting of mechanical biasing devices, electrical biasing devices, magnetic biasing devices, electro-magnetic biasing devices, hydraulic biasing devices, and pneumatic biasing devices.

9. An apparatus as recited in claim 1 wherein said linking means comprises at least one means selected from the group consisting of rods, cables, plates, bands, and tubes.

10. An apparatus as recited in claim 1 wherein said linking means comprises a series of longitudinally-oriented rods which pass through corresponding openings defined through longitudinally-adjacent surface elements, said openings allowing for the limited pulsating movement of the pulsating surface elements while said linking means is passed therethrough.

11. An apparatus as recited in claim 1 comprising a single unit which functions both as said energizing means and said biasing means.

12. An apparatus as recited in claim 1 comprising a unit which functions as both said biasing means and said linking means.

13. An apparatus as recited in claim 6 wherein the body portion of said push rod is irregular thus resulting in a non-uniform energizing of said surface elements.

14. An apparatus, for shaping, or directing the flow of, deformable materials, comprising at least one vibrating wall assembly having at least one surface which defines a specific mold or die geometric shape over which said deformable material will pass, said at least one vibrating wall assembly comprises:

(a) a plurality of pulsating, polygonally-shaped surface elements, and at least one non-pulsating, polygonally-shaped surface element;
  i. wherein each pulsating surface element is movable between a resting position and an energized position,
  ii. wherein said plurality of pulsating surface elements and said at least one non-pulsating surface element collectively define at least one surface element of a specific mold or die geometric shape when said plurality of pulsating surface elements are each in their resting position,
  iii. wherein a deformation in the surface of said specific mold or die geometric shape defined by the plurality of pulsating surface elements and the at least one non-pulsating surface element results when at least one pulsating surface element is in its energized position, and
  iv. wherein each pulsating surface element and each non-pulsating surface element has an opening defined therein which is dimensioned to receive a linking means, and which permits adjacent pulsating and non-pulsating surface elements to be interconnected to one another by a linking means;

(b) an energizing means for moving at least one pulsating surface element from its resting position to its energized position to form an energized surface element;

(c) a biasing means for moving said energized surface element from its energized position to its resting position; and (d) a linking means for interconnecting adjacent pulsating surface elements and non-pulsating surface elements,
  i. wherein said linking means limits the pulsating movement of pulsating surface elements, and
  ii. wherein said linking means passes through corresponding openings defined in adjacent pulsating and non-pulsating surface elements.

* * * * *

UNITED STATES PATENT AND TRADEMARK OFFICE
CERTIFICATE OF CORRECTION

PATENT NO. : 5,306,129
DATED : April 26, 1994
INVENTOR(S) : Jean-Pierre Ibar

It is certified that error appears in the above-indentified patent and that said Letters Patent is hereby corrected as shown below:

Column 18, claim 1, line 32, before "of" delete "element".

Column 20, claim 14, line 14, before "of" delete "element".

Signed and Sealed this

Thirtieth Day of August, 1994

Attest:

BRUCE LEHMAN

Attesting Officer

*Commissioner of Patents and Trademarks*